United States Patent
Zhang et al.

(10) Patent No.: US 9,650,882 B2
(45) Date of Patent: May 16, 2017

(54) SYSTEM FOR DETECTING LEAKAGE IN A PUMP USED IN HYDRAULIC FRACTURING

(71) Applicant: Caterpillar Inc., Peoria, IL (US)

(72) Inventors: Yanchai Zhang, Dunlap, IL (US); Evan Earl Jacobson, Edwards, IL (US); Koti Ratnam Padarthy, Edwards, IL (US); Venkata Bhagavathi Dandibhotla, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 155 days.

(21) Appl. No.: 14/571,758

(22) Filed: Dec. 16, 2014

(65) Prior Publication Data

US 2016/0168976 A1 Jun. 16, 2016

(51) Int. Cl.
*G01M 3/26* (2006.01)
*E21B 47/00* (2012.01)
*E21B 47/10* (2012.01)

(52) U.S. Cl.
CPC ...... *E21B 47/0007* (2013.01); *E21B 47/1025* (2013.01); *G01M 3/26* (2013.01)

(58) Field of Classification Search
None
See application file for complete search history.

(56) References Cited

U.S. PATENT DOCUMENTS

| | | | |
|---|---|---|---|
| 5,720,598 A * | 2/1998 | de Chizzelle | F04B 51/00 417/53 |
| 5,941,305 A | 8/1999 | Thrasher et al. | |
| 7,406,398 B2 | 7/2008 | Ollre et al. | |
| 8,374,834 B2 | 2/2013 | Bailey et al. | |
| 8,515,880 B2 | 8/2013 | Holley et al. | |
| 2005/0180868 A1* | 8/2005 | Miller | F04B 51/00 417/437 |
| 2009/0044938 A1 | 2/2009 | Crossley et al. | |
| 2010/0300683 A1 | 12/2010 | Looper et al. | |
| 2013/0151156 A1 | 6/2013 | Noui-Mehidi et al. | |
| 2013/0283773 A1 | 10/2013 | Hague | |

* cited by examiner

*Primary Examiner* — Paul West
*Assistant Examiner* — Mark A Shabman

(57) ABSTRACT

A system for detecting leakage in a pump includes a first pressure sensor, a second pressure sensor, multiple third pressure sensors, and a controller. The first pressure sensor is configured to output a pressure value associated with a suction manifold of the pump. The second pressure sensor is configured to output a pressure value associated with a discharge manifold of the pump. The third pressure sensors are configured to output a pressure value associated with the cylinders of the pump. The controller is disposed in communication with the first pressure sensor, the second pressure sensor, and the third pressure sensors. The controller is configured to determine amplitude of a leak, and a location of the leak in the pump on the basis of pressure values received from the first pressure sensor, the second pressure sensor, and the third pressure sensors.

13 Claims, 5 Drawing Sheets

SYSTEM FOR DETECTING LEAKAGE IN A PUMP USED IN HYDRAULIC FRACTURING

TECHNICAL FIELD

The present disclosure relates to a system for detecting leakage. More particularly, the present disclosure relates to a system for detecting leakage in a pump that is used in a hydraulic fracturing or 'fracking' operation.

BACKGROUND

Pumps that are used in hydraulic fracturing or 'fracking' operations are configured to pressurize and transfer a fracturing fluid into a downhole wellbore for creating cracks in deep-rock formations located under the earth's surface. Typically, a pump includes several components that may be subject to high working pressures. Such components may be at a risk of failure and cause a leakage in the pump. An overall performance of the pump may depend on the health of such components. A smooth working of the pump may be maintained by monitoring a health and performance of the components present in the pump. For reference, U.S. Pat. No. 7,689,368 discloses a system for early detection of component failure in a hydraulic system.

SUMMARY OF THE DISCLOSURE

In one aspect of the present disclosure, a system for detecting leakage in a pump includes a first pressure sensor, a second pressure sensor, a plurality of third pressure sensors, and a controller. The first pressure sensor is located in a suction manifold of the pump and configured to output a pressure value associated with the suction manifold. The second pressure sensor is located in a discharge manifold of the pump and configured to output a pressure value associated with the discharge manifold. At least one third pressure sensor is located in each cylinder of the pump such that the third pressure sensors are configured to output a pressure value associated with the cylinders of the pump. The controller is disposed in communication with the first pressure sensor, the second pressure sensor, and the third pressure sensors. The controller is configured to determine amplitude of a leak, and a location of the leak in the pump on the basis of pressure values received from the first pressure sensor, the second pressure sensor, and the third pressure sensors.

In another aspect of the present disclosure, a method of detecting leakage in a pump includes obtaining a pressure value associated with a suction manifold of the pump; obtaining a pressure value associated with a discharge manifold of the pump; and obtaining a pressure value associated with each cylinder of the pump. The method further includes determining amplitude of a leak, and a location of the leak in the pump on the basis of pressure values associated with the suction manifold, the discharge manifold, and each cylinder of the pump.

In yet another aspect of the present disclosure, a non-transitory computer-readable medium is provided. The non-transitory computer-readable medium has sequences of instruction stored thereon, the sequences of instruction including instruction which when executed by a computer-based system for detecting leakage in a pump, causes the computer-based system to obtain a pressure value associated with a suction manifold of the pump; obtain a pressure value associated with a discharge manifold of the pump; obtain a pressure value associated with each cylinder of the pump; and determine amplitude of a leak, and a location of the leak in the pump on the basis of pressure values associated with the suction manifold, the discharge manifold, and each cylinder of the pump.

Other features and aspects of this disclosure will be apparent from the following description and the accompanying drawings.

DETAILED DESCRIPTION

Figure 1:
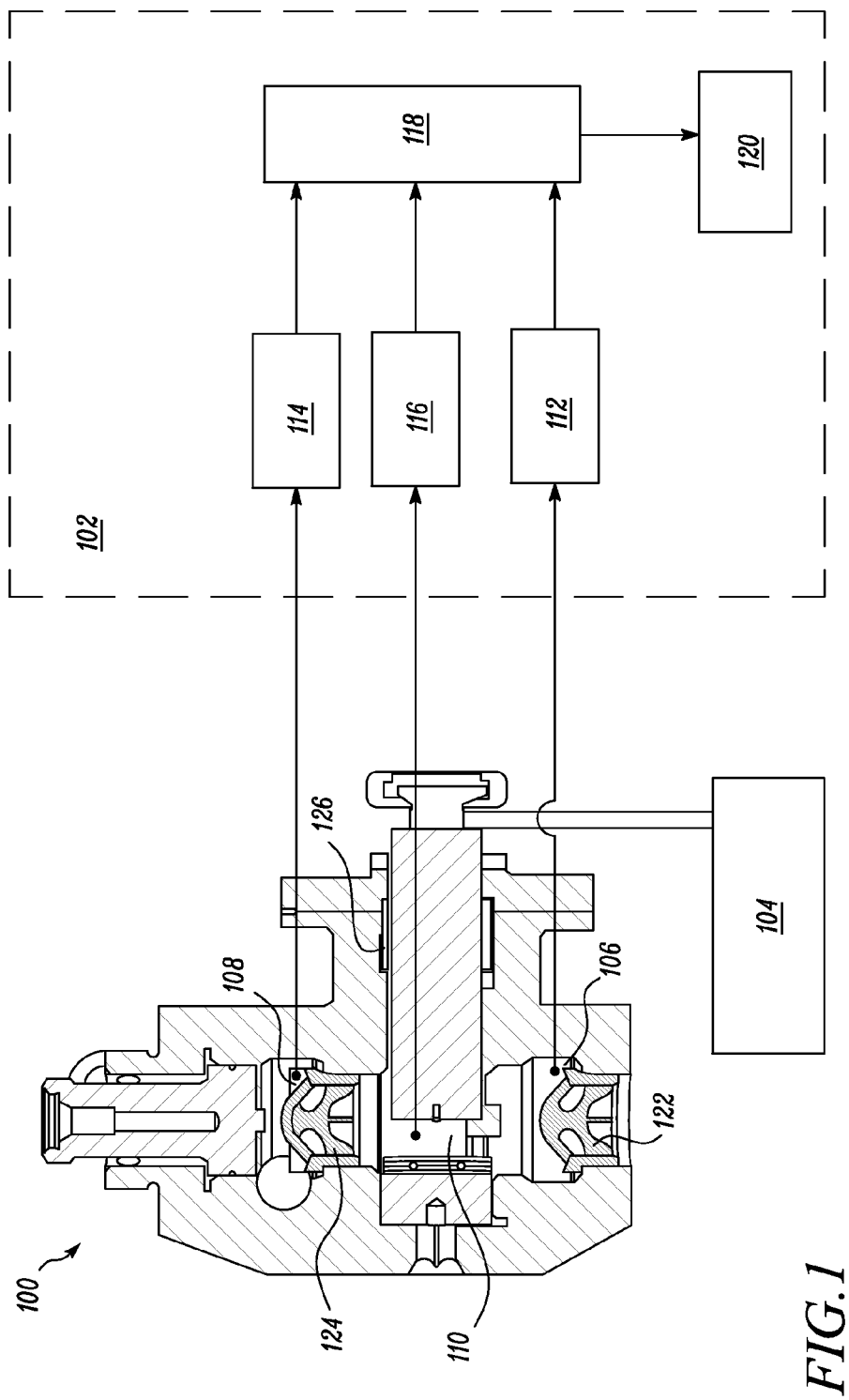
FIG. 1 is a diagrammatic illustration of an exemplary pump employing a system for detecting leakage in the pump, in accordance with an embodiment of the present disclosure.

The detailed description of exemplary embodiments of the disclosure herein makes reference to the accompanying drawings and figures, which show the exemplary embodiments by way of illustration only. While these exemplary embodiments are described in sufficient detail to enable those skilled in the art to practice the disclosure, it should be understood that other embodiments may be realized and that logical and mechanical changes may be made without departing from the spirit and scope of the disclosure. It will be apparent to a person skilled in the pertinent art that this disclosure can also be employed in a variety of other applications. Thus, the detailed description herein is presented for purposes of illustration only and not of limitation. For example, the steps recited in any of the method or process descriptions may be executed in any order and are not limited to the order presented.

For the sake of brevity, conventional data networking, application development and other functional aspects of the systems (and components of the user operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in a practical system.

The present disclosure is described herein with reference to system architecture, block diagrams and flowchart illustrations of methods, and processes according to various aspects of the disclosure. It will be understood that each functional block of the block diagrams, screenshots and the flowchart illustrations, and combinations of functional blocks in the block diagrams, screenshots and flowchart illustrations, respectively, can be implemented by computer program instructions.

These computer program instructions may be loaded onto a general purpose computer, special purpose computer, or other programmable data processing apparatus to produce the disclosed system, such that the instructions that execute on the computer or other programmable data processing apparatus create means for implementing the functions specified in the flowchart block or blocks. These computer program instructions may also be stored in a computer-readable memory that can direct a computer or other programmable data processing apparatus to function in a particular manner, such that the instructions stored in the computer-readable memory perform functions consistent with the present disclosure including instruction means which implement the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions specified in the flowchart block or blocks.

Accordingly, functional blocks of the block diagrams and flow diagram illustrations support combinations of means for performing the specified functions, combinations of steps for performing the specified functions, and program instruction means for performing the specified functions. It will also be understood that each functional block of the block diagrams and flowchart illustrations, and combinations of functional blocks in the block diagrams and flowchart illustrations, can be implemented by either special purpose hardware-based computer systems which perform the specified functions or steps, or suitable combinations of special purpose hardware and computer instructions.

The systems, methods and processes disclosed in conjunction with various embodiments of the present disclosure are embodied in systems, modules, and methods for detecting leakage in a pump that is used in a hydraulic fracturing or 'fracking' operation. Specific nomenclature used herein is merely exemplary and only used for descriptive purposes. Hence, such nomenclature must not be construed as being limiting of the scope of the present disclosure.

The present disclosure is now described in more detail herein in terms of the disclosed exemplary embodiments of system, processes and methods. This is for convenience only and is not intended to limit the application of the present disclosure. In fact, after reading the following description, it will be apparent to one skilled in the relevant art(s) how to implement the following disclosure in alternative embodiments.

FIG. 1 shows a diagrammatic illustration of an exemplary pump that can be used in a hydraulic fracturing or 'fracking' operation, hereinafter referred to as "pump 100". As shown in accordance with an embodiment of the present disclosure, the pump employs a system 102 for detecting leakage in the pump 100. As shown, the pump 100 of the present disclosure may be driven by a suitable power source 104. The power source 104, disclosed herein, may include but is not limited to, engines, gas turbine engines, generator sets, and other types of power sources known to one commonly skilled in the art.

The pump 100 includes a suction manifold 106, a discharge manifold 108, and multiple cylinders 110 located between the suction manifold 106 and the discharge manifold 108 (only one cylinder 110 visible in the cross-sectional view of the pump 100 of FIG. 1).

The suction manifold 106 may be configured to receive a fracking fluid that is mixed at a blender (not shown). The cylinders 110 are provided with movable components therein, for e.g., reciprocating pistons 111, that is configured to pressurize the fracking fluid during operation. The discharge manifold 108 of the pump 100 is configured to output pressurized fracking fluid therefrom into a wellbore for fracturing deep-rock formations (not shown) located under the earth's surface (not shown).

As shown in FIG. 1, the pump 100 may be coupled with the system 102 for detecting leakage in the pump 100. The system 102 includes a first pressure sensor 112, a second pressure sensor 114, and multiple third pressure sensors 116. However, only one third pressure sensor 116 is shown to correspond with the cross-sectional view of pump 100 in the illustrated embodiment of FIG. 1.

The first pressure sensor 112 may be associated with the suction manifold 106 of the pump 100 and configured to output a pressure value associated with the suction manifold 106. The second pressure sensor 114 may be associated with the discharge manifold 108 of the pump 100 and configured to output a pressure value associated with the discharge manifold 108. Each of third pressure sensors 116 may be associated with at least one cylinder 110 of the pump 100 so that each of third pressure sensors 116 are configured to output a pressure value associated with a corresponding cylinder 110 of the pump 100. As disclosed earlier herein, only one third pressure sensor 116 is shown to correspond with the cross-sectional view of pump 100 in the illustrated embodiment of FIG. 1.

With continued reference to FIG. 1, the system 102 includes a controller 118 that is disposed in communication with the first pressure sensor 112, the second pressure sensor 114, and third pressure sensors 116. The controller 118 is configured to determine amplitude of a leak, and a location of the leak in the pump 100 on the basis of the pressure values received from the first pressure sensor 112, the second pressure sensor 114, and third pressure sensors 116. Moreover, the system 102 of the present disclosure may additionally include a display device 120 that is coupled to the controller 118. The display device 120 is configured to display the amplitude of the leak, and the location of the leak besides other information that is output from the controller 118, explanation to which will be made later herein.

In an embodiment, the controller 118 is configured to determine the location of the leak as being in at least one of a suction valve 122 associated with the suction manifold 106, a discharge valve 124 associated with the discharge manifold 108, and a packing 126 associated with one or more cylinders 110 of the pump 100. Upon receiving the pressure values from the first pressure sensor 112, the second pressure sensor 114, and third pressure sensors 116, the controller 118 is configured to analyze pressure values in a time-frequency domain.

Figure 2:
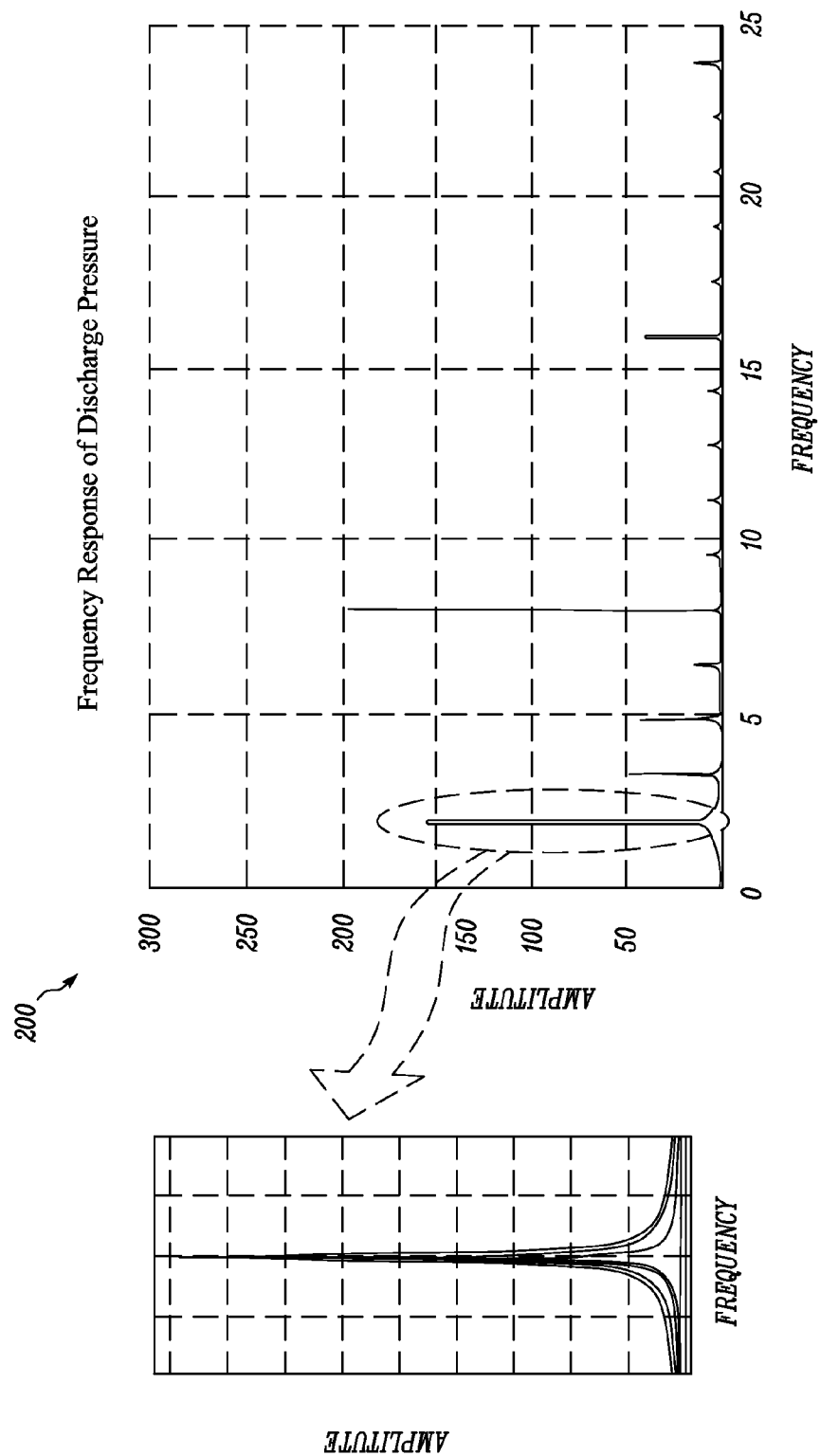
FIG. 2 is an exemplary plot of amplitude versus frequency for the pressure values received by a controller from a first pressure sensor, a second pressure sensor, and a third pressure sensor of the system.

An exemplary plot 200 of pressure values in the discharge manifold 108 is rendered in a time-frequency domain and shown in FIG. 2. It may be understood that this exemplary plot 200 may be visually presented to an operator by the display device 120 of FIG. 1. As such, the display device 120 is further configured to display the continuous plot 200 of amplitude versus frequency associated with pressure values (i.e., frequency response of pressure) from the first pressure sensor 112, the second pressure sensor 114, and each of third pressure sensors 116.

In the illustrated embodiment of FIG. 2, a frequency response of pressure in the discharge manifold 108 is continuously displayed by the display device 120 to assist the operator in monitoring the operation of the pump 100. However, such frequency response of pressure may be plotted for the pressure values in the suction manifold 106, and each cylinder 110 of the pump 100 to identify the amplitude and/or location of the leak.

As shown in the exemplary plot 200 of FIG. 2, higher amplitude of the pressure may be representative of a significantly large leak while lower amplitude may represent a small leak in the pump 100. Further, the frequency response information can also be used by a band pass filter (not shown) in a time domain so that the leak frequency may be separated from that of healthy pump frequency characteristics. The band pass filter, disclosed herein, may be any type of band pass filter commonly known to one skilled in the art. By using a band pass filter, the leak frequency characteristics may be distinguished from that of normal healthy pump frequency characteristics to identify the failed component in the pump 100. Moreover, a combination of an average amplitude level and the leak frequency information can be used to distinguish a single cylinder leak from a multiple cylinder leak.

Figure 3:
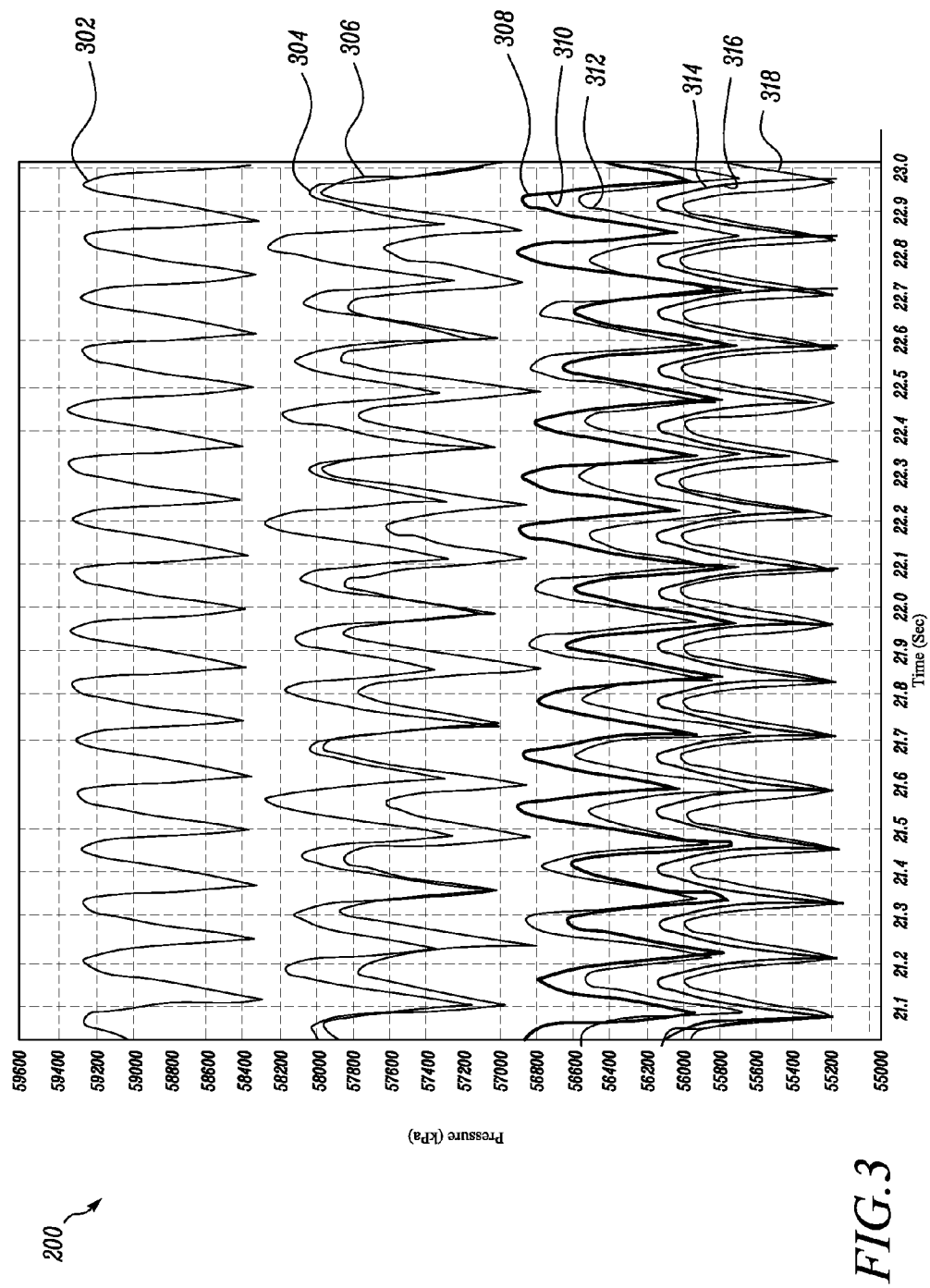
FIG. 3 is an exemplary plot of pressure versus time associated with the pressure values from FIG. 2.

An exemplary plot 300 of pressure versus time, associated with the pressure values from FIG. 2 (i.e., the pressure values associated with the discharge manifold 108 of the pump 100), is shown in FIG. 3. It may be noted that the controller 118 continuously receives the pressure values from the first pressure sensor 112, the second pressure sensor 114, and each of third pressure sensors 116, and the exemplary plot 300 of FIG. 3 may also be visually presented by the display device 120 of FIG. 1 to assist an operator in monitoring leakage in the pump 100.

As shown in the exemplary plot 300 of FIG. 3, if a first curve 302 having maximum and minimum pressures of about 59300 kilo-Pascal (kPa) and 58300 kPa is displayed on the display device 120, then the pump 100 may be regarded as having no leak at all. In an exemplary embodiment, the pump 100 may be understood as having no leak if the maximum and minimum pressure values associated with the discharge manifold 108 of the pump 100 lie above a threshold value, for example, 58200 kPa. This threshold value may vary depending on a type or configuration of the pump 100 used. Hence, it may be noted that the threshold value of 58200 kPa disclosed herein is merely exemplary in nature and non-limiting of this disclosure.

However, if a second curve 304 having a maximum pressure ranging from about 58,200 kPa to about 57,600 kPa and a minimum pressure ranging from about 57,350 kPa to about 56,800 kPa is displayed on the display device 120 in lieu of the first curve 302 disclosed herein, then the pump 100 may be regarded as having a 2 millimeter leak at the suction manifold 106.

Further, if a third curve 306 having a maximum pressure ranging from about 57,900 kPa to about 57,600 kPa and a minimum pressure ranging from about 57,400 kPa to about 56,900 kPa is displayed on the display device 120 in lieu of the first curve 302 disclosed herein, then the pump 100 may be regarded as having a 2 millimeter leak at the discharge manifold 108.

With reference to the exemplary plot 300 of FIG. 3, it may be observed that the second curve 304 and the third curve 306 have almost similar maximum and minimum pressure values. However, the second curve 304 and the third curve 306 have a phase-shift of 180 degrees therebetween. This phase-shift in the pattern of a given curve may help to distinctly identify a location of the leak as being present in the suction manifold 106 or the discharge manifold 108 of the pump 100.

Furthermore, if a fourth curve 308 having a maximum pressure ranging from about 56,900 kPa to about 56,600 kPa and a minimum pressure ranging from about 56,100 kPa to about 55,800 kPa is displayed on the display device 120 in lieu of the first curve 302 disclosed herein, then the pump 100 may be regarded as having a 2 millimeter leak at the suction manifold 106 adjacent to the $1^{st}$ and $3^{rd}$ cylinders 110 of the pump 100.

Still further, if a fifth curve 310 having a maximum pressure ranging from about 56,850 kPa to about 56,550 kPa and a minimum pressure ranging from about 55,700 kPa to about 56,000 kPa is displayed on the display device 120 in lieu of the first curve 302 disclosed herein, then the pump 100 may be regarded as having a 2 millimeter leak at the discharge manifold 108 adjacent to the $1^{st}$ and $3^{rd}$ cylinders 110 of the pump 100.

Furthermore, if a sixth curve 312 having a maximum pressure of about 56,170 kPa and a minimum pressure of about 55,250 kPa is displayed on the display device 120 in lieu of the first curve 302 disclosed herein, then the pump 100 may be regarded as having a 2 millimeter leak at the suction manifold 106 adjacent to all the cylinders 110 of the pump 100.

Still further, if a seventh curve 314 having a maximum pressure of about 56,150 kPa and a minimum pressure of about 55,250 kPa is displayed on the display device 120 in place of the first curve 302 disclosed herein, then the pump 100 may be regarded as having a 2 millimeter leak in a packing 126 of each cylinder 110 of the pump 100. The packing 126 associated with at least one cylinder 110 is shown in the cross-sectional view of the pump 100 in FIG. 1.

With reference to the exemplary plot 300 of FIG. 3, it may be observed that the sixth curve 312 and the seventh curve 314 have almost similar maximum and minimum pressure values. However, the controller 118 disclosed herein is configured to distinctly identify the pattern characteristics of the seventh curve 314 as being different from the pattern characteristics of the sixth curve 312. Therefore, the controller 118 may display the leak as being associated with the packing 126 of each cylinder 110 as opposed to a 2 millimeter leak at the suction manifold 106 adjacent to all the cylinders 110 of the pump 100.

Similarly, if an eighth curve 316 having a maximum pressure ranging from about 56,900 kPa to about 56,600 kPa and a minimum pressure ranging from about 56,100 kPa to about 55,800 kPa is displayed on the display device 120 in place of the first curve 302 disclosed herein, then the pump 100 may be regarded as having a 2 millimeter leak in the packing 126 associated the $1^{st}$ and the $3^{rd}$ cylinder 110 of the pump 100. As disclosed earlier herein, the packing 126 associated with at least one cylinder 110 is shown in the cross-sectional view of the pump 100 in FIG. 1.

Furthermore, if a ninth curve 318 having a maximum pressure of about 56,050 kPa and a minimum pressure of about 55,200 kPa is displayed on the display device 120 in place of the first curve 302 disclosed herein, then the pump 100 may be regarded as having a 2 millimeter leak in the discharge manifold 108 of the pump 100.

In various embodiments of the present disclosure, it may be noted that in analyzing the pressure values and determining the location of the leak in the pump 100, the controller 118 may optionally employ empirical data, statistical models, simulation models, or experimental test data pertaining to previous trial runs of the pump 100. Such computations may employ formulae, algorithms, or routines that are commonly known to one skilled in the art without deviating from the spirit of the present disclosure.

Further, in various embodiments of the present disclosure, the controller 118 disclosed herein may embody a single microprocessor or multiple microprocessors that include components for analyzing pressure values from the received from the first, second, and third pressure sensors 112, 114, and 116. Numerous commercially available microprocessors can be configured to perform the functions of the controller 118 disclosed herein. It should be appreciated that the controller 118 could readily be embodied in a general machine microprocessor capable of controlling numerous machine functions. The controller 118 may include a memory, a secondary storage device, a processor, and any other components for running an application. Various other circuits may be associated with the controller 118 such as power supply circuitry, signal conditioning circuitry, solenoid driver circuitry, and other types of circuitry. Various routines, algorithms, and/or programs can be programmed within the controller 118 for execution thereof to determine the amplitude of the leak, and a location of the leak from the pressure values received from the first, second, and third pressure sensors 112, 114, and 116.

Figure 4:
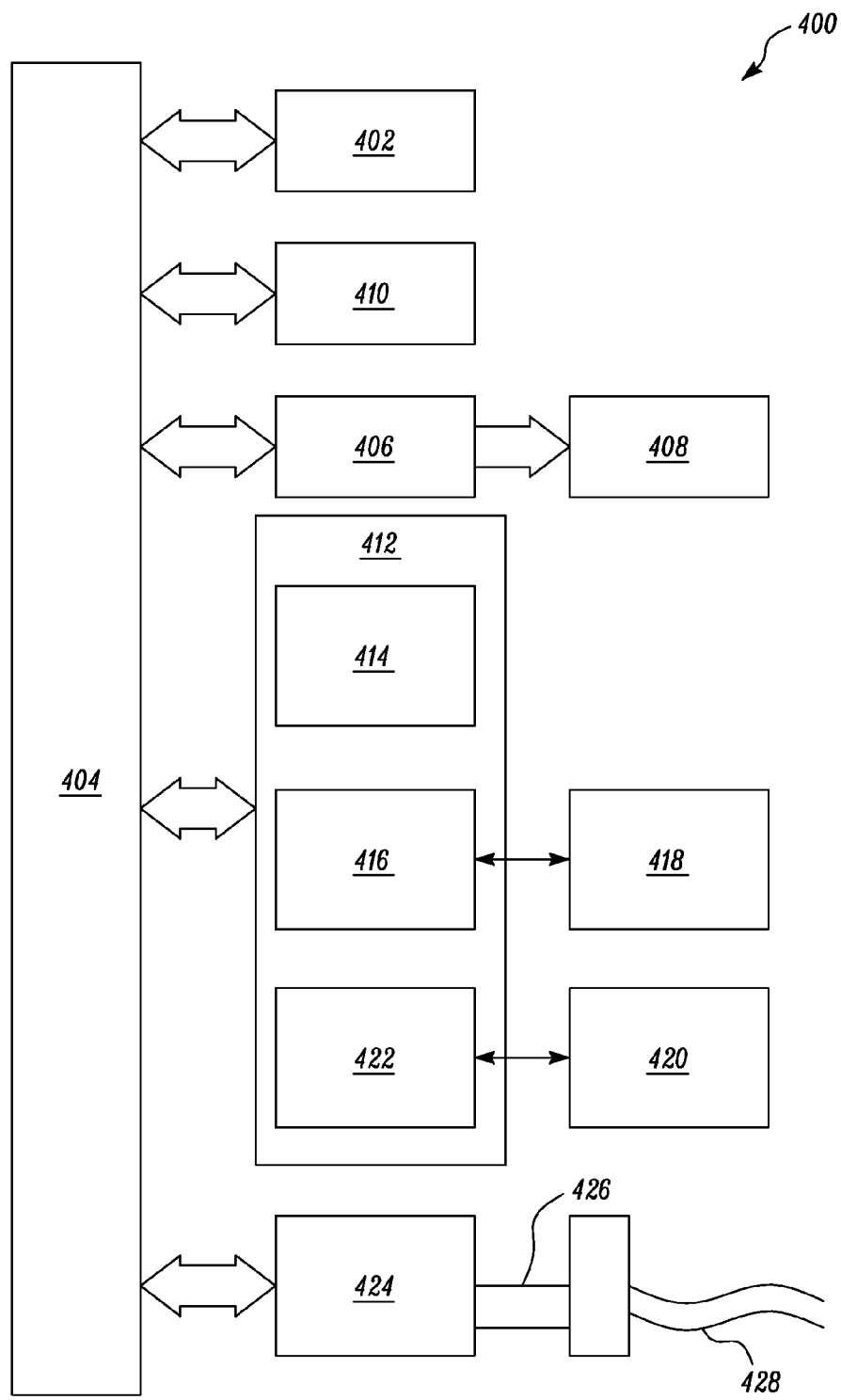
FIG. 4 is a block diagram of an exemplary computer system, according to an embodiment of the present disclosure.

In accordance with an embodiment of the present disclosure, the present disclosure is directed towards one or more computer systems capable of carrying out the functionality described herein. An example of the computer based system includes a computer system 400, which is shown by way of a block diagram in FIG. 4.

Computer system 400 includes at least one processor, such as a processor 402. Processor 402 may be connected to a communication infrastructure 404, for example, a communications bus, a cross-over bar, a network, and the like. Various software embodiments are described in terms of this exemplary computer system 400. Upon perusal of the present description, it will become apparent to a person skilled in the relevant art(s) how to implement the present disclosure using other computer systems and/or architectures.

Computer system 400 includes a display interface 406 that forwards graphics, text, and other data from communication infrastructure 404 (or from a frame buffer) for display on a display unit 408.

Computer system 400 further includes a main memory 410, such as random access memory (RAM), and may also include a secondary memory 412. Secondary memory 412 may further include, for example, a hard disk drive 414 and/or a removable storage drive 416, representing a floppy disk drive, a magnetic tape drive, an optical disk drive, etc. Removable storage drive 416 reads from and/or writes to a removable storage unit 418 in a well-known manner. Removable storage unit 418 may represent a floppy disk, magnetic tape or an optical disk, and may be read by and written to by removable storage drive 416. As will be appreciated, removable storage unit 418 includes a computer usable storage medium having stored therein, computer software and/or data, In accordance with various embodiments of the present disclosure, secondary memory 412 may include other similar devices for allowing computer programs or other instructions to be loaded into computer system 400. Such devices may include, for example, a removable storage unit 420, and an interface 422. Examples of such may include a program cartridge and cartridge interface (such as that found in video game devices), a removable memory chip (such as an erasable programmable read only memory (EPROM), or programmable read only memory (PROM)) and associated socket, and other removable storage units 420 and interfaces 422, which allow software and data to be transferred from removable storage unit 420 to computer system 400.

Computer system 400 may further include a communication interface 424. Communication interface 424 allows software and data to be transferred between computer system 400 and external devices. Examples of communication interface 424 include, but may not be limited to a modem, a network interface (such as an Ethernet card), a communications port, a Personal Computer Memory Card International Association (PCMCIA) slot and card, and the like. Software and data transferred via communication interface 424 may be in the form of a plurality of signals, hereinafter referred to as signals 426, which may be electronic, electromagnetic, optical or other signals capable of being received by communication interface 424. Signals 426 may be provided to communication interface 424 via a communication path (e.g., channel) 428. Communication path 428 carries signals 426 and may be implemented using wire or cable, fiber optics, a telephone line, a cellular link, a radio frequency (RF) link and other communication channels.

In this document, the terms "storage medium" is used to generally refer to media such as removable storage drive 416, a hard disk installed in hard disk drive 414, signals 426, and the like. These computer program products provide software to computer system 400. The present disclosure is hereby also directed to such computer program products.

Computer programs (also referred to as computer control logic) may be stored in the main memory 410 and/or the secondary memory 412. Computer programs may also be received via the communication interface 404. Such computer programs, when executed, enable computer system 400 to perform the functions consistent with the present disclosure, as discussed herein. In particular, the computer programs, when executed, enable processor 402 to perform the features of the present disclosure.

In accordance with an embodiment of the present disclosure, where the disclosure is implemented using a software, the software may be stored in a computer program product and loaded into computer system 400 using removable storage drive 416, hard disk drive 414 or communication interface 424. The control logic (software), when executed by processor 402, causes processor 402 to perform the functions of the present disclosure as described herein.

In another embodiment, the present disclosure is implemented primarily in hardware using, for example, hardware components such as application specific integrated circuits (ASIC). Implementation of the hardware state machine so as to perform the functions described herein will be apparent to persons skilled in the relevant art(s).

Various embodiments disclosed herein are to be taken in the illustrative and explanatory sense, and should in no way be construed as limiting of the present disclosure. All joinder references e.g., attached, affixed, coupled, engaged, connected, and the like are only used to aid the reader's understanding of the present disclosure, and may not create limitations, particularly as to the position, orientation, or use of the systems, processes, and/or methods disclosed herein. Therefore, joinder references, if any, are to be construed broadly. Moreover, such joinder references do not necessarily infer that two elements are directly connected to each other.

Additionally, all numerical terms, such as, but not limited to, "first", "second", "third", or any other ordinary and/or numerical terms, should also be taken only as identifiers, to assist the reader's understanding of the various elements, embodiments, variations and/or modifications of the present disclosure, and may not create any limitations, particularly as to the order, or preference, of any element, embodiment, variation and/or modification relative to, or over, another element, embodiment, variation and/or modification.

It is to be understood that individual features shown or described for one embodiment may be combined with individual features shown or described for another embodiment. The above described implementation does not in any way limit the scope of the present disclosure. Therefore, it is to be understood although some features are shown or described to illustrate the use of the present disclosure in the context of functional segments, such features may be omitted from the scope of the present disclosure without departing from the spirit of the present disclosure as defined in the appended claims.

INDUSTRIAL APPLICABILITY

Figure 5:
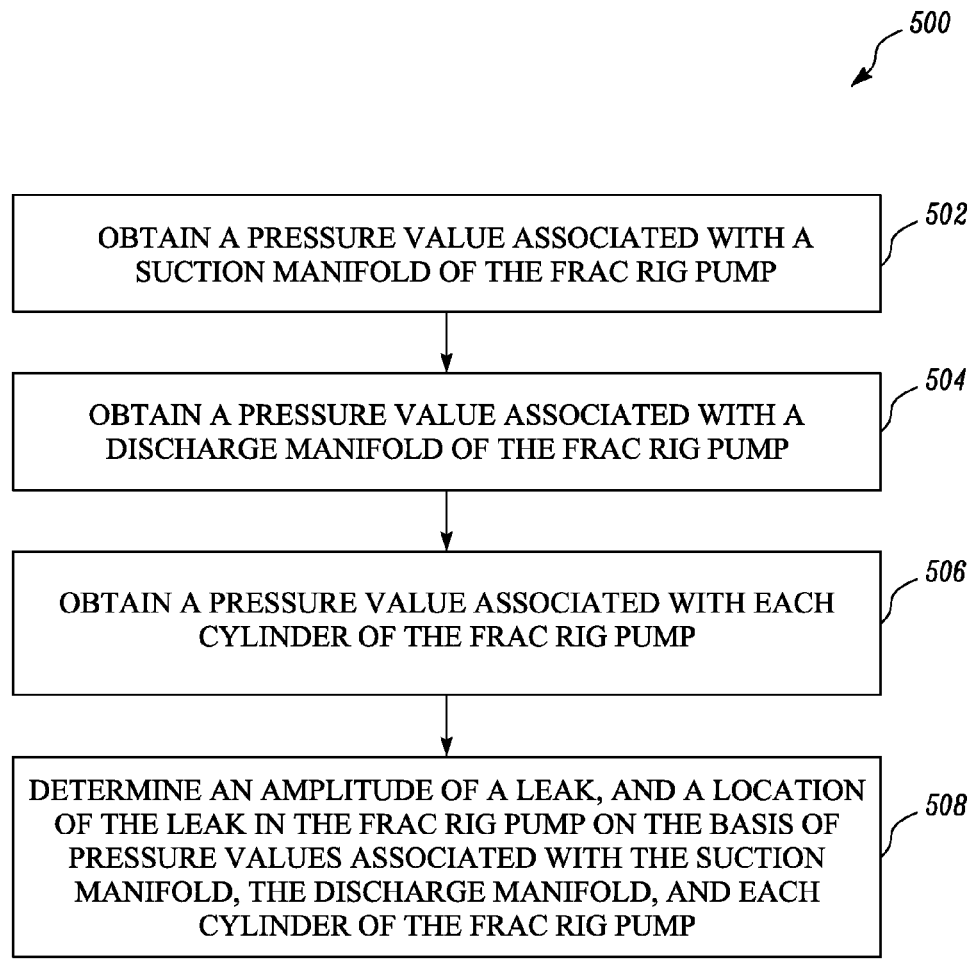
FIG. 5 is a flowchart illustrating a method for detecting leakage in the pump, in accordance with an embodiment of the present disclosure.

FIG. 5 illustrates a method 500 of detecting leakage in the pump 100. At step 502, the method 500 includes obtaining the pressure value associated with the suction manifold 106 of the pump 100. At step 504, the method 500 further includes obtaining the pressure value associated with the discharge manifold 108 of the pump 100. At step 506, the method 500 further includes obtaining the pressure value associated with each cylinder 110 of the pump 100. At step 508, the method 500 further includes determining amplitude of the leak, and the location of the leak in the pump 100 on the basis of pressure values associated with the suction manifold 106, the discharge manifold 108, and each cylinder 110 of the pump 100.

In methodologies directly or indirectly set forth herein, various steps and operations are described in one possible order of operation, but those skilled in the art will recognize that steps and operations may be re-arranged, replaced, or eliminated without departing from the spirit and scope of the present disclosure as set forth in the claims.

Embodiments of the present disclosure have applicability for use and implementation for detecting leakage in pumps. Typically, components of a pump are subject to high working pressures during operation of the pump. Consequently, a frequency of failure and subsequent maintenance of the components in a given pump may be high.

With implementation of the system 102 disclosed herein, operators of pumps may be alerted of a leakage in the pump in addition to a location of the leakage as well. With the visual presentation of a leakage and its location on the display device 120, an operator may plan to perform shutdown, replacement, maintenance, overhaul, and/or other service routines on the pump in a timely manner with minimal obstruction to an ongoing procedure in a jobsite, i.e., a wellbore. Moreover, as the location of the leakage is visually presented to an operator by the display device 120, the operator may conveniently know what type of corrective actions need to be performed to remedy the leakage in the pump. Therefore, embodiments of the present disclosure are configured to aid the operators of pumps in performing a diagnosis of a pump in the case of a leakage. Furthermore, with use of the system 102 disclosed herein, time and effort previously incurred with maintenance of pumps may be offset thus saving costs to operators of pumps.

While aspects of the present disclosure have been particularly shown and described with reference to the embodiments above, it will be understood by those skilled in the art that various additional embodiments may be contemplated by the modification of the disclosed machines, systems, processes, and methods without departing from the spirit and scope of what is disclosed. Such embodiments should be understood to fall within the scope of the present disclosure as determined based upon the claims and any equivalents thereof.

What is claimed is:

1. A system for detecting leakage in a pump, the system comprising:
    a first pressure sensor located in a suction manifold of the pump and configured to output a suction manifold pressure signal indicative of a pressure of the suction manifold;
    a second pressure sensor located in a discharge manifold of the pump and configured to output a discharge manifold pressure signal indicative of a pressure of the discharge manifold;
    a plurality of third pressure sensors, wherein at least one third pressure sensor is located in each cylinder of the pump such that each of the third pressure sensors are configured to output a cylinder pressure signal indicative of a pressure of one of the cylinders of the pump; and
    a controller disposed in communication with the first pressure sensor, the second pressure sensor, and the third pressure sensors; the controller including a memory with a plurality of pressure verses time curve sets including a suction manifold pressure curve, a discharge manifold pressure curve, and at least one cylinder pressure curve, each pressure verses time curve set having an associate location of a leak in the pump and amplitude of a leak in the pump; the controller configured to:
        determine an actual suction manifold pressure verses time curve at least in part in response to the suction manifold pressure signal,
        determine an actual discharge manifold pressure verses time curve at least in part in response to the discharge manifold time curve,
        determine at least one actual cylinder pressure verse time curve at least in part in response to one of the cylinder pressure signals;
        match the actual suction manifold pressure verses time curve, the actual discharge manifold verse time curve, and the at least one actual cylinder pressure verses time curve to one of the plurality of pressure verses time curve sets; and
        determine an amplitude of a leak, and a location of the leak in the pump on the basis of the associated location of the leak in the pump and the amplitude of the leak in the pump of the matched curve set.

2. The system of claim 1, wherein the controller is configured to determine the location of the leak as being in at least one of a suction valve associated with the suction manifold, a discharge valve associated with the discharge manifold, and a packing associated with one or more cylinders of the pump.

3. The system of claim 1, wherein the controller is configured to analyze pressure values from the first pressure sensor, the second pressure sensor, and the third pressure sensors in a time-frequency domain.

4. The system of claim 1 further comprising a display device coupled to the controller, wherein the display device is configured to display the amplitude of the leak, and the location of the leak.

5. The system of claim 4, wherein the display device is configured to display a continuous plot of pressure versus time for the suction manifold pressure signal, the discharge manifold pressure signal, and the at least one cylinder pressure signal received by the controller from the first pressure sensor, the second pressure sensor, and the third pressure sensors.

6. The system of claim 4, wherein the display device is further configured to display a continuous plot of amplitude versus frequency associated with pressure values from each of the first pressure sensor, the second pressure sensor, and the third pressure sensors.

7. A method of detecting leakage in a pump, the method comprising:
   receiving with a controller, a suction manifold pressure signal from a first pressure sensor located in a suction manifold of the pump;
   receiving with the controller, a discharge manifold pressure signal from a second pressure sensor located in a discharge manifold of the pump;
   receiving with the controller, cylinder pressure signals from third pressure sensors, a third pressure sensor located in each cylinder of the pump;
   determining with the controller an actual suction manifold pressure verses time curve at least in part in response to the suction manifold pressure signal;
   determining with the controller an actual discharge manifold pressure verses time curve at least in part in response to the discharge manifold time curve;
   determining with the controller an actual cylinder pressure verse time curve for each cylinder of the pump, at least in part in response to the cylinder pressure signal associated with the cylinder;
   matching with the controller the actual suction manifold pressure verses time curve, the actual discharge manifold verse time curve, and the at least one actual cylinder pressure verses time curve to one of a plurality of pressure verses time curve sets stored in the memory of the controller, each pressure verses time curve set associated with a location of a leak in the pump and an amplitude of a leak in the pump; and
   determining with the controller an amplitude of a leak, and a location of the leak in the pump on the basis of the associated location of the leak in the pump and the amplitude of the leak in the pump of the matched curve set.

8. The method of claim 7, wherein the determining the location of the leak includes determining the location of the leak as being in at least one of a suction valve associated with the suction manifold, a discharge valve associated with the discharge manifold, and a packing associated with one or more cylinders of the pump.

9. The method of claim 7 further comprising analyzing pressure values associated with the suction manifold, the discharge manifold, and the cylinders of the pump in a time-frequency domain.

10. The method of claim 7 further comprising displaying the amplitude of the leak, and the location of the leak on a display device.

11. The method of claim 10 further comprising displaying a continuous plot of pressure versus time for the pressure values associated with the suction manifold, the discharge manifold, and each cylinder of the pump.

12. The method of claim 11, further comprising displaying a continuous plot of amplitude versus frequency for the pressure values associated with the suction manifold, the discharge manifold, and each cylinder of the pump.

13. A non-transitory computer-readable medium having stored thereon sequences of instruction, the sequences of instruction including instruction which when executed by a controller of a hydraulic fracturing system with a pump, the pump including a suction manifold with a suction manifold pressure sensor configured to generate a suction manifold pressure signal indicative of a suction manifold pressure, a discharge manifold with a discharge manifold pressure sensor configured to generate a discharge manifold pressure signal indicative of a discharge manifold pressure, and multiple cylinders, each cylinder with a cylinder pressure sensor configured to generate a cylinder pressure signal indicative of a cylinder pressure causes the controller to perform operations, comprising:
   receiving the suction manifold pressure signal and determine an actual suction manifold pressure verses time curve;
   receiving the discharge manifold pressure signal and determine an actual discharge manifold pressure verses time curve;
   receiving each cylinder pressure signal associated with each cylinder and determine an actual cylinder pressure verses time curve for each cylinder of the pump; and
   determining, by the controller, an amplitude of a leak, and a location of the leak in the pump on the basis of matching the actual suction manifold pressure verses time curve, the actual discharge pressure verses time curve, and the cylinder pressure verses time curves to one of a plurality of pressure verses time curve sets stored in the memory of the controller or on the computer-readable medium, each pressure verses time curve set associated with a location of a leak in the pump and an amplitude of a leak in the pump.

* * * * *